United States Patent [19]

Campbell

[11] 3,721,653

[45] March 20, 1973

[54] POLYAMIDE FIBERS FROM MIXTURE OF BIS-(P-AMINOCYCLOHEXY)METHANE AND 4,4'-METHYLENE DIANILINE

[75] Inventor: Robert W. Campbell, Bartlesville, Okla.

[73] Assignee: Phillips Petroleum Company, Bartlesville, Okla.

[22] Filed: April 12, 1971

[21] Appl. No.: 133,416

[52] U.S. Cl.............260/78 R, 8/178 R, 260/33.4 R, 264/176 F, 264/178 R
[51] Int. Cl. .............................................C08g 20/20
[58] Field of Search.....................................260/78 R

[56] References Cited

UNITED STATES PATENTS

| | | |
|---|---|---|
| 2,451,695 | 10/1948 | Schreiber..........................260/78 R |
| 2,512,606 | 6/1950 | Bolton et al. .....................260/78 R |
| 2,669,556 | 2/1954 | Sperati..............................260/78 R |
| 3,249,591 | 5/1966 | Gadecki et al....................260/78 R |
| 3,393,210 | 7/1968 | Speck ...............................260/78 R |
| 3,416,302 | 12/1968 | Knospe..............................260/78 R |
| 3,598,789 | 10/1971 | Tippetts............................260/78 R |

Primary Examiner—Harold D. Anderson
Attorney—Young & Quigg

[57] ABSTRACT

Polyamide fibers employing 4,4'-methylenedianiline or a methyl derivative thereof as a comonomer in combination with bis(p-aminocyclohexyl)methane or methyl derivative thereof and an acyclic $C_8$ to $C_{16}$ dicarboxylic acid have improved dyeability with retention of crystallinity.

10 Claims, No Drawings

POLYAMIDE FIBERS FROM MIXTURE OF BIS-(P-AMINOCYCLOHEXY)METHANE AND 4,4'-METHYLENE DIANILINE

This invention relates to the production of polyamides.

In one of its more specific aspects, this invention relates to the production of polyamide fibers which possess improved characteristics of dyeability and resistance to shrinkage in boiling water.

Various polyamides formed from the condensation reaction of bis(p-aminocyclohexyl)methane or a methyl derivative thereof, herein collectively referred to as PACM, and straight-chained dicarboxylic acids are known. Such materials are employed as synthetic fibers. As such, it is desirable that they possess certain properties which make them suitable for the various conditions, such as temperature, to which they are subjected in conventional dyeing and laundering processes. For example, that polyamide prepared from bis(p-aminocyclohexyl)methane and dodecanedioic acid is recognized as having suitable properties in these respects as evidenced by its high glass transition temperature. It is an object of this invention to provide fibers which have improved properties of dyeability and resistance to shrinkage in boiling water.

According to this invention, there is provided a linear polyamide which comprises the reaction product of a stereoisomeric mixture of bis(p-aminocyclohexyl)methane or a methyl derivative thereof and 4,4'-methylenedianiline or a methyl derivative thereof and a straight-chain $C_8$ to $C_{16}$ dicarboxylic acid having the formula $HO_2C(CH_2)_xCO_2H$, where $x$ has a value within the range of 6 to 14, the polyamide being capable of being drawn into continuous filaments.

The bis(p-aminocyclohexyl)methane or methyl derivative thereof is represented by the formula

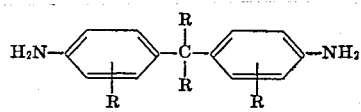

in which each R is a member selected from the group consisting of hydrogen and methyl. At least 40 percent of the bis(p-aminocyclohexyl)methane or methyl derivative thereof will be of the trans-trans configuration.

The 4,4'-methylenedianiline or methyl derivative thereof can be represented by the formula

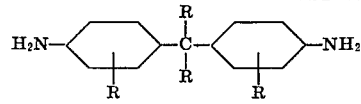

in which R is as defined above.

Examples of the straight-chain dicarboxylic acids containing eight to 16 carbon atoms include suberic acid, azelaic acid, sebacic acid, undecanedioic acid, dodecanedioic acid, tridecanedioic acid, tetradecanedioic acid, pentadecanedioic acid and hexadecanedioic acid and their mixtures.

The molar ratio of the PACM to the 4,4'-methylenedianiline or methyl derivative thereof, hereinafter referred to collectively as MDA, will be within the range of about 60 to 40 to about 90 to 10, respectively, and preferably from about 65 to 35 to about 85 to 15. The molar ratio of the total of the amino compounds to the dicarboxylic acid should be substantially 1 to 1 although up to about 5 mole percent excess of either the amino compounds or of the acid can be employed.

The polyamides of this invention are prepared by conventional polymerization procedures such as those disclosed in U.S. Pat. No. 2,512,606. Such procedures include a reaction time of from about 2 to about 6 hours at a temperature in the range of about 200° to 340° C. Various extraneous materials can be present in the reaction zone, these materials including water which acts as a heat transfer agent and acetic acid which controls and stabilizes the molecular weight of the polyamide product.

The polyamide fibers of this invention exhibit unique properties which distinguish them from polymers heretofore produced. These polyamides possess these properties in the following approximate ranges.

| Property | Broad Range | Preferred Range |
| --- | --- | --- |
| Crystallinity | Detectable | Detectable |
| Wet Tg, °C. | 60–100 | 65–95 |
| Disperse Dyeability (K/S) | ≥ 10 | ≥10 |
| Work Recovery, % | >50 | >60 |
| Boiling Water Shrinkage, % | <10 | <10 |

These properties are exhibited by the polymers in fiber form, formed by melt spinning, drawing and annealing.

As used herein, these properties are defined as follows:

Crystallinity - based upon differential thermal analysis.

Disperse Dyeability - using either 1.5% Celanthrene Fast Blue 2G, referred to herein as "C", or 2 percent Terasil Blue, referred to herein as "T". K/S values are described in J. Opt. Soc. Am., 38, 1067 (1948).

Work Recovery — from 3 percent elongation per ASTM 1774–64.

Boiling Water Shrinkage – per ASTM D 2102–64.

The method used herein to determine wet Tg was as follows: Five reference polyamides derived from bis(p-aminocyclohexyl)methane were first prepared. These were (1) PACM-12, a polyamide produced from bis(p-aminocyclohexyl)methane (54 percent trans-trans) and dodecanedioic acid in a molar ratio of 1:1; (2) PACM-8, a polyamide produced from bis(p-aminocyclohexyl)methane (54 percent trans-trans) and suberic acid in a molar ratio of 1:1; (3) PACM/12 (80/20)-12, a polyamide produced from bis(p-aminocyclohexyl)methane (54 percent trans-trans), 1,12-dodecanediamine, and dodecanedioic acid in a molar ratio of 0.8:0.2:1, respectively; (4) PACM/BAMCH (80/20)-12, a polyamide produced from bis(p-aminocyclohexyl)methane (54 percent trans-trans), 1,4-bis(aminomethyl)-cyclohexane (60 percent trans), and dodecanedioic acid in a molar ratio of 0.8:0.2:1, respectively; and, (5) PACM/BAMCH (20/80)-12, a polyamide produced from bis(p-aminocyclohexyl)methane (54 percent trans-trans), 1,4-bis(aminomethyl)cyclohexane (60 percent trans), and dodecanedioic acid in a molar ratio of 0.2:0.8:1, respectively. The water absorption, dry Tg, and wet Tg of each of these reference polyamides were determined, and the ratio of wet Tg (in °K) to dry Tg (in °K), expressed as percent Tg retention, was determined. These values are shown in the following table:

| Polyamide | water Absorption, %[1] | Dry Tg,°C[2] | Wet Tg,°C[3] | Tg retention %[4] |
|---|---|---|---|---|
| PACM-12 | 2.4 | 132 | 110 | 94.6 |
| PACM-8 | 4.2 | 150 | 95 | 87.0 |
| PACM/12 (80/20)-12 | 1.8 | 98 | 82 | 96.0 |
| PACM/BAMCH (80/20)-12 | 3.7 | 121 | 81 | 89.8 |
| PACM/BAMCH (20/80)-12 | 3.0[5] | 90 | 69 | 94.2 |

(1) Films, 5 mils thick, were pressed and cooled quickly by quenching in tap water. After drying under vacuum over $P_2O_5$ to constant weight (about 48 hours), these films were submerged in boiling water for 80 minutes, blotted dry, and placed in a desiccator containing a saturated magnesium acetate solution in contact with excess solid (a 65 percent relative humidity environment). They were weighted again after standing 48 hours, and the percent water absorbed was determined, based on this weight.
(2) Determined by differential thermal analysis.
(3) Temperature at which drawn fiber's initial modulus is one-half its value at 30° C. (ASTM D 2256–69).
(4) Tg (wet, °K)/Tg (dry, °K) × 100.
(5) Value is probably somewhat high since film had holes which encapsulated water.

The percent water absorption was then plotted against the percent Tg retention for each of the reference polyamides to provide a reference curve from which the wet Tg of a specified polyamide within the scope of this invention was readily calculated by determination of the percent water absorption and the dry Tg and selection of the point on the reference curve which corresponded to the percent water absorption of the polymer.

This invention is illustrated by the following preparation in which the quantities of reactants indicated were reacted under the conditions described above. The molten polymer was recovered by extrusion into an aqueous quench bath in a carbon dioxide atmosphere. The strands of polymer were cut into pellets and melt spun to produce the polyamide fibers of the properties indicated. All inherent viscosities were in m-cresol, with a polymer concentration of 0.5 weight percent, at 30° C.

EXAMPLE I 111.7 parts by weight of PACM having no methyl substituent, 26.3 parts by weight of 4,4'-methylenedianiline and 152.9 parts by weight of dodecanedioic acid were reacted at about 320° C. for about 3 hours at a pressure up to about 500 psig, following gradual heating to 320° C. for about 2½ hours. The copolymer had an inherent viscosity of 0.62.

The polyamides formed from the materials concerned in this invention exhibit unusual properties in comparison with polymers formed from other materials or from the same materials in percentages outside of the scope of this invention as shown by the following data which compare the polymer produced in Example I with a polymer prepared from PACM having no methyl substituent and a straight-chain dicarboxylic acid (dodecanedioic acid) having 12 carbon atoms in its straight chain, and indicated PACM-12, and with nylon 66 and with a polymer prepared outside of the scope of this invention in which the molar ratio of the PACM to MDA, each having no methyl substituent, was 50 to 50 with dodecanedioic acid as the other monomer, the polymer being designated PACM/MDA (50/50)-12. This comparison is as follows:

| polymer | crystallinity | glass trans. temp., wet °C. | disperse dyeability K/S | work recovery % | boiling water shrinkage % |
|---|---|---|---|---|---|
| nylon 66 | Yes | −15 | 17 | 37 | 6 |
| PACM-12 | Yes | 108 | 7.5 | 76 | 3 |
| PACM MDA (50/50) −12 | No | | | | |
| Ex. I | Yes | 92 | 15 | 79 | 7 |

It will be seen from the above that the polymer of Example I, the polymer of this invention, possesses a crystallinity not possessed by the polymer formed by the 50/50 molar ratio of diamine reactants and possesses a combination of properties not possessed by the nylon 66 or by the PACM-12, these properties making the material of this invention unexpectedly superior in respect to those properties which make them suitable for the various conditions to which they are subjected in conventional dyeing and laundering processes.

It will be evident that various modifications can be made to the method of this invention. However, such are considered to be within the scope of the invention.

What is claimed is:

1. A linear polyamide fiber consisting essentially of the reaction product of a mixture of
   a. one of bis(p-aminocyclohexyl)methane or C methyl derivative thereof;
   b. a straight chain $C_8$ to $C_{16}$ dicarboxylic acid having the general formula $HO_2C(CH_2)_xCO_2H$ in which x is 6 to 14; and c. a 4,4'-methylenedianiline or C methyl derivative thereof having the formula

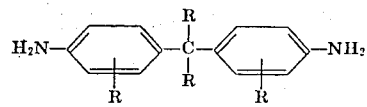

in which R is hydrogen or methyl, at least 40 weight percent of said bis(p-aminocyclohexyl)methane or methyl derivative thereof being of the trans-trans configuration, the molar ratio of said bis(p-aminocyclohexyl)methane or methyl derivative to said 4,4'-methylenedianiline or methyl derivative thereof being within the range of from about 60 to 40 to about 90 to 10 and the molar ratio of the total of said bis(p-aminocyclohexyl)methane or methyl derivative thereof and said 4,4'-methylenedianiline or methyl derivative thereof being within the range of from about 0.95 to 1 to about 1.05 to 1.

2. The polyamide of claim 1 in which said fiber possesses crystallinity, has a disperse dyeability of not less than 10 and a boiling water shrinkage of not greater than 1 percent.

3. The polyamide of claim 1 in which said dicarboxylic acid is dodecanedioic acid.

4. The polyamide of claim 3 in which said mixture consists essentially of said bis(p-aminocyclohexyl)methane, said 4,4'-methylenedianiline and said dodecanedioic acid, in mole ratios of about 5.3 to 1.3 to 6.6, respectively.

5. The polyamide of claim 4 in which said polyamide has a disperse dyeability of about 15 and a boiling water shrinkage of about 7.

6. The polyamide fiber of claim 1 in which said fiber has a work recovery of not less than about 50 percent and a wet glass transition temperature within the range of about 60° to about 100° C.

7. The polyamide fiber of claim 1 in which said fiber has a work recovery of not less than about 60 percent and a wet glass transition temperature within the range of about 65° to about 95° C.

8. The polyamide fiber of claim 1 in which the molar ratio of said one of bis(p-aminocyclohexyl)methane or methyl derivative thereof and said 4,4'-methylenedianiline are present in said mixture in a molar ratio within the range of from about 65 to 35 to about 85 to 15.

9. The polyamide fiber of claim 6 in which the molar ratio of said one of bis(p-aminocyclohexyl)methane or methyl derivative thereof and said 4,4'-methylenedianiline are present in said mixture in a molar ratio within the range of from about 65 to 35 to about 85 to 15.

10. The polyamide fiber of claim 7 in which the molar ratio of said one of bis(p-aminocyclohexyl)methane or methyl derivative thereof and said 4,4'methylenedianiline are present in said mixture in a molar ratio within the range of from about 65 to 35 to about 85 to 15.

* * * * *